Patented Oct. 27, 1931

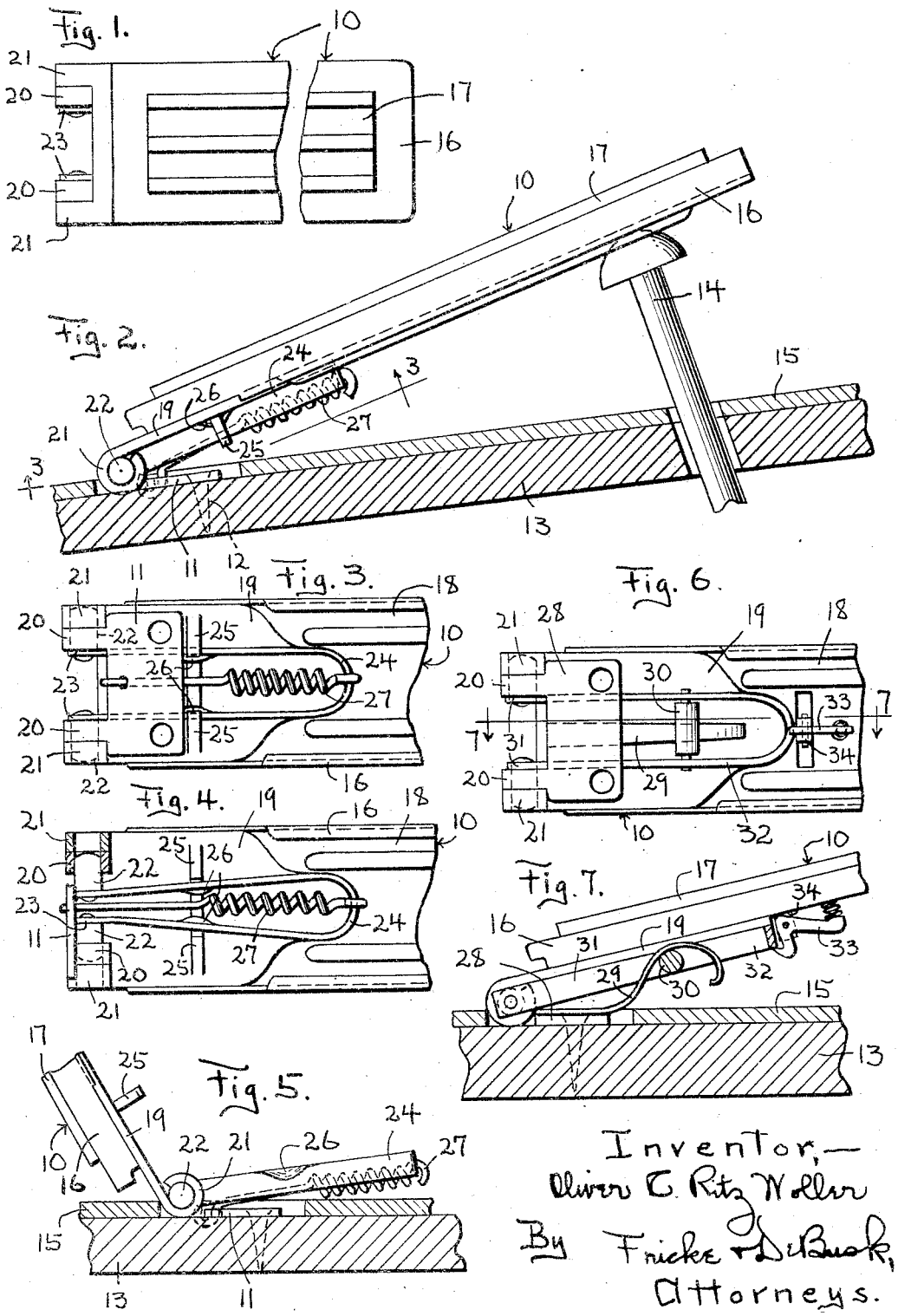

1,829,028

UNITED STATES PATENT OFFICE

OLIVER C. RITZ WOLLER, OF CHICAGO, ILLINOIS

ACCELERATOR PEDAL

Application filed September 26, 1930. Serial No. 484,527.

My invention relates to accelerator pedals and it has for its object the provision of a new and improved form and arrangement of parts by which a device of this type may be mounted in position so as to cooperate to advantage with the ordinary foot accelerator of an automobile. In most automobiles, mats are employed covering the floor boards, and it is desirable that the arrangement of the pedal mounting means shall be such that the pedal may be readily detached from its operative position for enabling the removal of the mat. In any event, it is desirable that the pedal be easily and quickly removable so as to provide ready access to the floor for cleaning purposes. At the same time, it is important that the pedal be normally held in snug engagement with the accelerator so as to prevent rattling of any of the parts. It is accordingly the object of my invention to provide a new and improved arrangement of parts by which the pedal may be held yieldingly in engagement with the accelerator and by reason of which the pedal may be removable quickly from operative position when desired.

It is one of the objects of my invention to provide an improved arrangement of this type in which the means for attaching the pedal in operative position upon its supporting bracket may be so mounted upon either the bracket or the pedal as to be releasable for the removal of the pedal without such attaching means being detached from the bracket or pedal by which it is carried. It is another object of my invention to provide an arrangement of this type comprising an auxiliary swinging frame pivotally mounted with respect to the pedal member and the attaching bracket member, and means for releasably holding said auxiliary member from swinging away from one of said members, together with yielding means tending to hold said auxiliary swinging member from swinging in the direction away from the other member.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings,—

Fig. 1 is a top plan view of the preferred form of my improved pedal device, with an intermediate portion broken away;

Fig. 2 is a side view of the pedal shown in Fig. 1 mounted in position upon the floor of an automobile;

Fig. 3 is a bottom plan view of the left-hand portion of the device as shown in Fig. 2, as seen substantially at line 3—3 of Fig. 2;

Fig. 4 is a view similar to Fig. 3, but with the attaching bracket standing in substantially perpendicular position with respect to the pedal, and with the pivot pins moved inwardly toward each other for releasing the pedal from the attaching bracket, certain of the parts being shown in section;

Fig. 5 is a view of the left-hand portion of the parts as shown in Fig. 2, but with the pedal turned into changed position and with the intermediate auxiliary swinging member released from the pedal;

Fig. 6 is a view similar to Fig. 3 but showing a modified form of construction; and Fig. 7 is a central vertical section through the device as shown in Fig. 6, with the device secured in position upon a car.

Referring now to Figs. 1 to 5 inclusive, in which corresponding parts are indicated by the same reference characters, 10 indicates a pedal member pivotally connected with a bracket member 11. In the arrangement shown in Fig. 2, the bracket 11 is connected by means of screws 12 upon the floor 13 of an automobile in position for the pedal 10 to rest upon the upper end of the accelerator 14 of the car. A mat 15 is mounted upon the floor boards 13, the mat having suitable openings for the reception of the bracket 11 and the accelerator 14.

In the construction shown, the pedal comprises a frame-work 16 preferably of sheet aluminum holding a rubber mat 17 in position upon a steel base plate 18, such plate 18 being reenforced at one end by a plate 19 which in the construction shown in spot-welded thereto. As is best shown in Fig. 3, the bracket 11 comprises a metal plate having attaching lugs 20 thereon preferably formed integrally with the plate, such lugs being positioned so as to fit snugly between similar lugs 21 formed integrally with the reenforcing plate 19. The lugs 20 and 21 are pivotally connected together by means of pivot pins 22 which are mounted in alignment with each other within the perforated lugs 20 and 21. As is perhaps best shown in Fig. 3, the inner ends of the pivot pins 22 are connected with the arms 23 of a spring yoke 24, the connection in the construction shown being effected by means of reduced end portions of such pins riveted within openings in said arms 23. The arrangement is such that when the arms 23 of the yoke 24 stand in their separated positions as shown in Fig. 3, the pivot pins 22 serve for pivotally connecting the lugs 20 and 21. When, however, the arms 23 of the spring yoke are pressed together into the position as shown in Fig. 4, the pivot pins 22 are moved longitudinally of themselves out of engagement with the lugs 21, while still being retained in engagement with the lugs 20. With the parts in the condition as shown in Fig. 3, the pedal member 10 is pivotally mounted upon the bracket 11. With the parts in the condition as shown in Fig. 4, the pedal member 10 is freed entirely from the bracket member 11. The yoke member 24 is preferably formed of resilient material whereby such yoke member tends to hold the pivot pins 22 in their separated operative position as shown in Fig. 3.

The yoke 24 comprises in effect an auxiliary member pivotally mounted upon the same axis as that upon which the pedal 10 and bracket 11 are pivotally connected with each other. For releasably connecting such auxiliary member with the pedal member 10, I have provided arms 25 extending toward each other upon the bottom face of the pedal 10 in spaced relation to each other and in spaced relation to the bottom face of the pedal. In the arrangement shown, the arms 25 are struck down from the plate 19. The position of the lugs 25 is such that when the arms 23 of the yoke stand in operative position as shown in Fig. 3, the yoke 24 is engaged by the arms 25 so as to be held against swinging with respect to the pedal 10. When the arms 23 are pressed together as shown in Fig. 4 for moving the pivot pins 22 out of operative position, such arms 23 are carried out of engagement with the arms 25 so as to permit movement of the yoke about the pivot pins 22 away from the pedal 10, into some such position as that shown in Fig. 5. The arrangement is such that when the auxiliary swinging member 24 has been released from the lugs or arms 25 and has been permitted to expand for permitting the pivot pins 22 again to assume their operative positions, the arms 25 may be again brought into operative engagement with the arms 23 by pressure of the yoke against the arms or lugs 25, the arms 23 of the yoke member being diagonally positioned at their point of engagement with the lugs 25 as indicated by the numeral 26 for bringing about an automatic snap engagement of such arms with the lugs 25.

For holding the auxiliary swinging member 24 from swinging away from the bracket member 11, I have provided a coiled spring 27 connected at one end with the bracket 11 at a point adjacent to the axis of the pivotal connection between the bracket 11 and the pedal 10, such spring being connected at its opposite end with the end portion of the yoke 24 at some little distance from said axis. As will be readily understood, when the pedal 10 is moved upwardly and toward the left in Fig. 2 with respect to the bracket 11, the spring 27 must necessarily be expanded and lengthened.

When it is desired to install a pedal device such as is shown in my drawings, it is only necessary that a small opening be cut through the mat 15 for the reception of the bracket 11. With the parts in the position as shown in Fig. 2, the spring 27 serves to hold the pedal 10 pressed downwardly into close engagement with the accelerator 14 and to hold the pivot pins 22 and the cooperating hinge parts under tension with respect to each other whereby such parts are effectively prevented from any tendency to rattle. When it is desired to remove the pedal 10, the pedal is first preferably moved upwardly and toward the left in Fig. 2 against the action of the spring 27 so as to provide ready access to the under face of the pedal. Pressure is then applied upon the arms 23 for moving the pins 22 out of engagement with the hinging means 21 carried by the pedal so as to enable the operator to lift the pedal free of the bracket 11, the arms 23 having been meantime free from engagement with the lugs 25 of the pedal. Upon the release of the arms 23, the pivot pins 22 will again be forced into their separated positions with respect to each other. When it is desired to again attach the pedal member 10 into operative position, the arms 23 of the yoke are again pressed together, with such yoke preferably in the position as shown in Fig. 5, and the pedal 10 is readily placed in the position as shown in said Fig. 5 ready for receiving the pins 22 within the hinge lugs 21 upon the release of the yoke 24. The yoke 24 is then moved toward the pedal 10 for the automatic engagement of the lugs 25 with the yoke, whereupon the device is again ready for use.

Referring now to the construction as shown in Figs. 6 and 7, the arrangement is the same as that above described, except for the means for detachably connecting the auxiliary swinging member with the pedal and the means for yieldingly connecting the auxiliary member with the bracket. In the construction shown in said Figs. 6 and 7, a bracket member 28 is employed having a flat spring 29 mounted thereon so as to engage a roller 30 journaled between the arms 31 of a spring yoke 32, the arrangement being such that the spring 29 tends to hold the spring yoke 32 from swinging away from the bracket 28. The means for holding the spring yoke 32 detachably connected with the pedal 10 comprises a spring latch 33 pivotally mounted between lugs 34 struck down from the bottom plate 18 of the pedal, the arrangement being such that the latch is adapted to have automatic connection with the spring yoke upon pressure of the yoke toward the pedal, while at the same time the yoke is readily releasable manually from the pedal. Inasmuch as the operation of the parts as shown in Figs. 6 and 7 is substantially the same as that above described, it is not believed to be necessary to describe the same in further detail herein.

By the use of my construction, the pedal 10 can be very easily and very quickly detached from the bracket 11 so as to provide ready access to the floor beneath the pedal and so as to provide for easy removal of the mat 15 if desired. The spring arrangement holds the pedal snugly against the cooperating parts so as to prevent any rattling of the parts. It will be noted that all the parts forming the hinge connection between the pedal and its supporting bracket are located underneath the pedal, entirely out of the way, there being no likelihood of a driver's shoe or other clothing becoming caught on any of the parts.

While I prefer to employ the constructions as shown in my drawings and as above described, it is to be understood that the invention is not to be limited to such constructions except as the claims may be so limited by the prior art.

I claim:—

1. A device of the type described, comprising in combination a bracket member, a pedal member, hinging means fixedly mounted on said members respectively and covered by said pedal member when in normal operating position, and pivot pins underlying said pedal member and movably mounted on one of said members in substantial alignment with each other adapted by cooperation with said first named hinging means to pivotally connect said pedal with said bracket when said pins are moved to their separated positions with respect to each other and adapted to permit removal of the pedal from the bracket when the pins are moved out of normal position toward each other.

2. A device of the type described, comprising in combination a bracket member, a pedal member, hinging means fixedly mounted on said members respectively and covered by said pedal member when in normal operating position, pivot pins underlying said pedal member and movably mounted on one of said members in substantial alignment with each other adapted by cooperation with said first named hinging means to pivotally connect said pedal with said bracket when said pins are moved to their separated positions with respect to each other and adapted to permit removal of the pedal from the bracket when the pins are moved out of normal position toward each other, and a flexible yoke member having its end portions connected with the inner ends of said pins respectively adapted when the arms of the yoke are bent inwardly to withdraw said pivot pins from operative position for permitting removal of the pedal from the bracket.

3. A device of the type described, comprising in combination a bracket member, a pedal member, means for pivotally connecting said members, an auxiliary member pivotally mounted on the pivotal axis of said two members, yielding means tending to hold said auxiliary member from swinging away from one of said first named members, and means for releasably connecting said auxiliary member with the other of said members for swinging therewith.

4. A device of the type described, comprising in combination a bracket member, a pedal member, means providing a releasable pivotal connection between said members, an auxiliary member pivotally mounted on the pivotal axis of said two members, yielding means acting independently of the pivotal connection between said bracket member and said pedal member tending to hold said auxiliary member from swinging away from one of said first named members, and means for releasably connecting said auxiliary members with the other of said first named members for swinging therewith.

5. In a device of the type described, the combination of two principal members comprising a bracket member and a pedal member, connections comprising pivot means carried by one of said principal members serving releasably to connect said member with the other principal member, an auxiliary member mounted on said pivot means and extending longitudinally of the pedal member between said two principal members, yielding means tending to hold said auxiliary member from swinging away from the principal member which carries said pivot means, and means for releasably connecting said auxiliary member with said other principal member for holding the auxiliary member from swinging with respect to said other principal member.

6. In a device of the type described, the combination of two principal members comprising a bracket member and a pedal member, an auxiliary member, pivot means connecting said auxiliary member with one of said principal members as a unit, said pivot means also releasably connecting the other principal member pivotally with the unit comprising said auxiliary member and its connected principal members, yielding means tending to hold said auxiliary member from swinging away from the principal member to which it is connected, and means for releasably connecting said auxiliary member with said other principal member whereby said yielding means opposes swinging movement of the pedal member away from the bracket member.

7. A device of the type described, comprising in combination a bracket member, a pedal member, bearings provided on one of said members, pivot pin means carried by the other of said members, said bearings and pivot pin means being arranged so that the pivot pin means may quickly be inserted into or withdrawn from said bearings for attaching or detaching said bracket and pedal, an auxiliary member swingingly mounted on said pivot pin means, means for releasably connecting said auxiliary member with the member on which said bearings are provided, and yielding means tending to hold said auxiliary member from swinging away from the member on which said pivot pin means is mounted.

8. A device of the type described, comprising in combination a bracket member, a pedal member, means providing a releasable pivotal connection between said members, an auxiliary member pivotally mounted on the pivotal axis of said two members, a coiled spring connected at one end with the bracket member at a point adjacent to said axis and connected at its opposite end with said auxiliary member at a point considerably removed from said axis so as to tend to hold the auxiliary member from swinging away from said bracket, and means for releasably connecting said auxiliary member with said pedal for swinging therewith.

9. A device of the type described, comprising in combination a bracket member, a pedal member, means providing a releasable pivotal connection between said members, a yoke member pivotally mounted on the pivotal axis of said first named two members, a coiled spring connected at one end with said bracket member at a point adjacent to said axis and connected at its opposite end with said auxiliary member at a point considerably removed from said axis so as to swing between the arms of said yoke and serving normally to hold said auxiliary member from swinging away from said bracket, and means for releasably connecting said auxiliary member with said pedal member for swinging therewith.

10. A device of the type described, comprising in combination a bracket member, a pedal member, hinging means fixedly mounted on said members respectively, pivot pins movably mounted on one of said members in substantial alignment with each other adapted by cooperation with said first named hinging means to pivotally connect said pedal with said bracket when said pins are moved to their separated positions with respect to each other and adapted to permit removal of the pedal from the bracket when the pins are moved out of normal position toward each other, a spring yoke having its end portions connected with said pins respectively tending to hold said pins in their separated positions with respect to each other and adapted when the arms of the yoke are bent inwardly to withdraw said pivot pins from their operative positions for permitting removal of the pedal from the bracket, yielding means tending to hold said yoke from swinging about said pivot pins away from one of said members, and spaced lugs carried by the other of said members adapted by engagement with said yoke to hold the yoke releasably against swinging with respect to said other member when the arms of the yoke are in normal separated position with respect to each other and adapted to stand clear of said yoke when the yoke arms are bent inwardly for withdrawing said pivot pins from their operative positions.

11. A device of the type described, comprising in combination a bracket member, a pedal member, hinging means fixedly mounted on said members respectively, pivot pins movably mounted on one of said members in substantial alignment with each other adapted by cooperation with said first named hinging means to pivotally connect said pedal with said bracket when said pins are moved to their separated positions with respect to each other and adapted to permit removal of the pedal from the bracket when the pins are moved out of normal position toward each other, a spring yoke having its end portions connected with said pins respectively tending to hold said pins in their separated positions with respect to each other and adapted when the arms of the yoke are bent inwardly to withdraw said pivot pins from operative positions for permitting removal of the pedal from the bracket, yielding means tending to hold said yoke from swinging about said pivot pins away from said bracket, and inwardly projecting arms struck down from a metal plate portion of said pedal into spaced relation to said pedal and spaced relation to each other adapted by engagement with said yoke to hold the yoke releasably against swinging with respect to the pedal when the arms of the yoke are in normal separated positions with respect to each other and adapted to stand clear of said yoke when the yoke arms are bent inwardly for withdrawing said pivot pins from their operative positions.

12. A device of the type described, comprising in combination a bracket member, a pedal member, means providing a releasable pivotal connection between said members, an auxiliary member pivotally mounted on the pivotal axis of said two members, a flat spring carried by said bracket member and bearing on said auxiliary member tending to hold said auxiliary member from swinging away from said bracket, and means for releasably connecting said auxiliary member with said pedal for swinging therewith.

13. A device of the type described, comprising in combination a bracket member, a pedal member, hinging means fixedly mounted on said members respectively, pivot pins movably mounted on one of said members in substantial alignment with each other adapted by cooperation with said first named hinging means to pivotally connect said pedal with said bracket when said pins are moved to their separated positions with respect to each other and adapted to permit removal of the pedal from the bracket when the pins are moved out of normal position toward each other, a spring yoke having its end portions connected with said pins respectively tending to hold said pins in their separated positions with respect to each other and adapted when the arms of the yoke are bent inwardly to withdraw said pivot pins from operative positions for permitting removal of the pedal from the bracket, a flat spring carried by said bracket member, a roller journalled in the arms of said yoke against which said spring bears for holding said yoke from swinging away from said bracket, and means for releasably connecting said auxiliary member with said pedal for swinging therewith.

OLIVER C. RITZ WOLLER.